Patented June 10, 1930

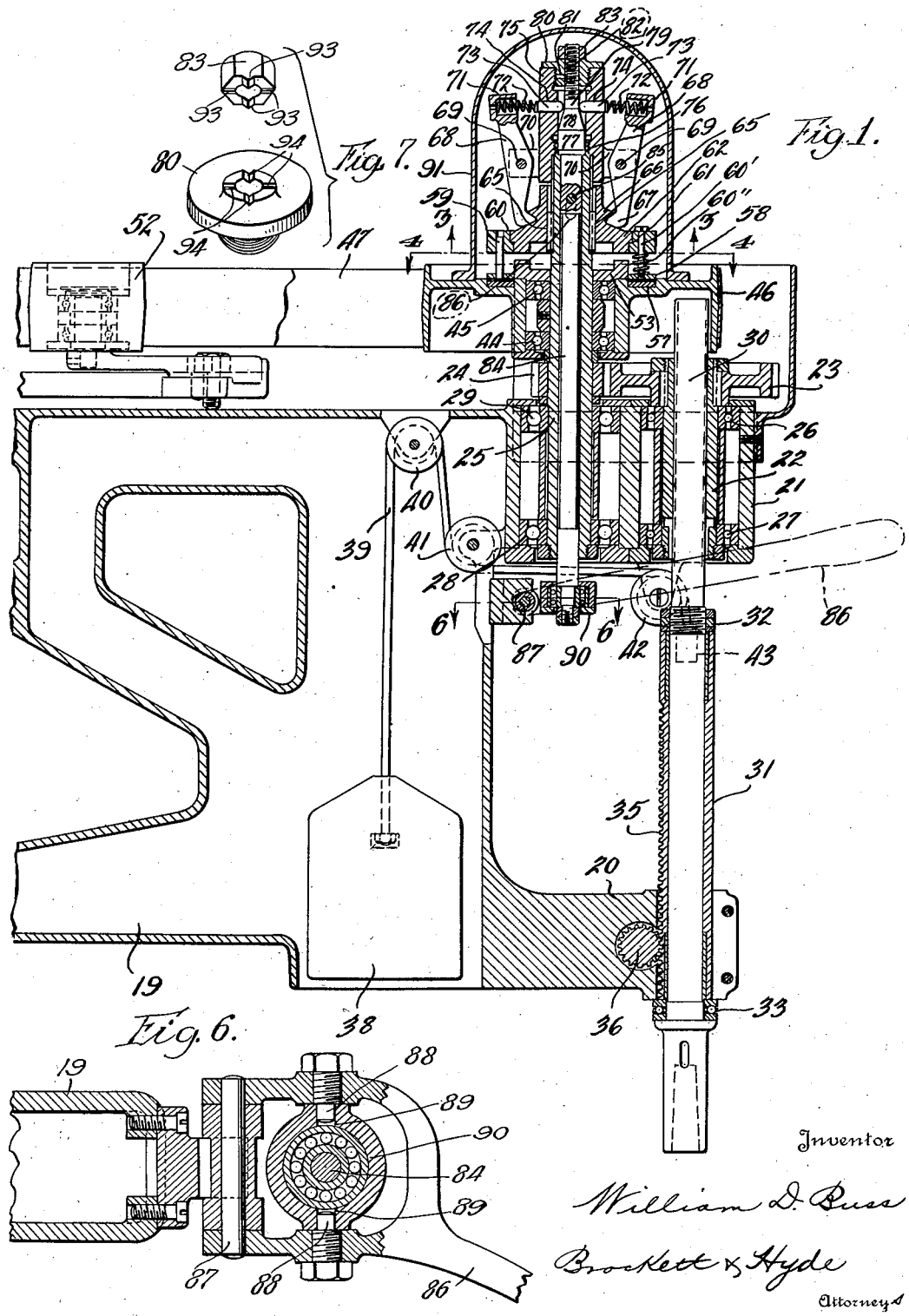

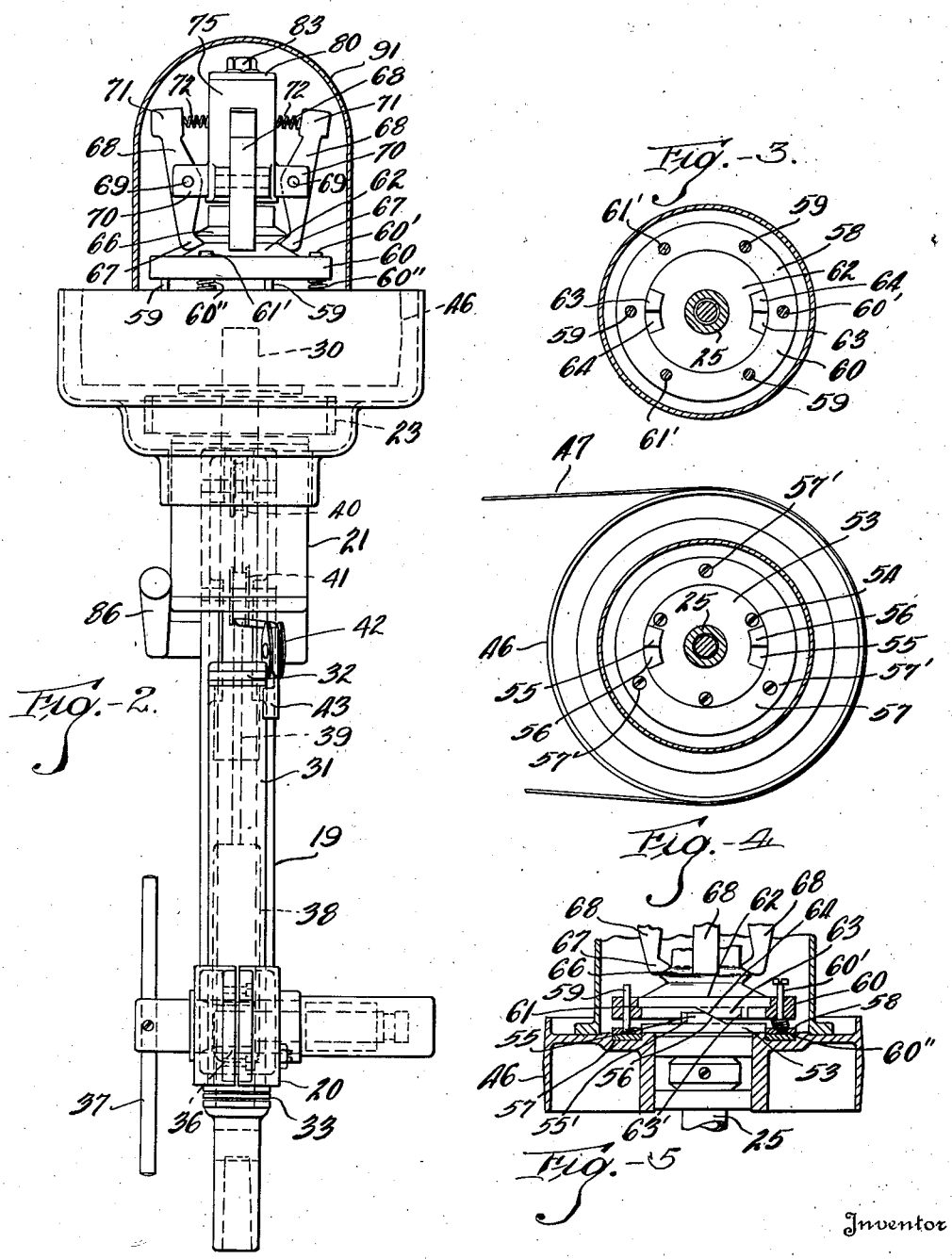

1,762,155

UNITED STATES PATENT OFFICE

WILLIAM D. BUSS, OF CLEVELAND, OHIO, ASSIGNOR TO THE HAMMOND MANUFACTURING COMPANY, OF CLEVELAND, OHIO, A CORPORATION OF OHIO

CLUTCH MECHANISM FOR SETTING THREADED ARTICLES

Application filed October 10, 1925. Serial No. 61,844.

This invention relates to apparatus for removing and setting up nuts, studs, cap screws and the like and has particular reference to means for insuring the predetermined gradual starting engagement and quick release of the setting mechanism so that all like articles will be set uniformly and in accordance with the wishes of the operator, all without shock to the mechanism.

In the present invention all like threaded articles are set up or "socked home" by substantially the same predetermined tension and this is accomplished by providing a suitable driving head with compound clutch mechanism of both frictionally initial engaging and yielding jaw or semi-positive type and held in engagement by adjustable mechanism which effects a predetermined engagement characteristic and uniform driving tension upon the clutch mechanism at all times and therefore effects the uniform setting of all like threaded articles.

The details of the foregoing and other details of the invention will be brought out more clearly in the following description, drawings and claims.

Referring to the drawings, Fig. 1 is a sectional view of the driving head of a machine constructed according to my invention; Fig. 2 is an enlarged front elevation of the driving head; Fig. 3 is a section on the line 3—3, Fig. 1, looking in the direction of the arrows; Fig. 4 is a section upon the line 4—4, Fig. 1, looking in the direction of the arrows; Fig. 5 is a section through the clutch; and Fig. 6 is a section through the line 6—6, Fig. 1; and Fig. 7 is a detailed view of the tension adjusting device.

The parts hereinafter described are carried by the usual swinging arm 19, as will be familiar to one skilled in the art.

The forward end of the arm 19 is provided with a lower spindle head bearing bracket 20 and an upper spindle head bearing bracket 21, the latter being provided with a driven quill 22 carrying a driven gear 23 meshing with a driving pinion 24 secured to a clutch quill 25. The quill 22 is mounted in ball bearing structures indicated at 26 and 27 while the clutch quill is mounted in ball bearing structures indicated at 28 and 29. The driven quill 22 is loosely splined to the upper end of the spindle 30 which has surrounding it a rack sleeve 31 held between an upper thrust bearing 32 and a lower thrust ball bearing 33. The spindle 30 is provided at its lower end with a suitable socket wrench or other tool for engaging the threaded article. The rack sleeve 31 is provided with rack teeth 35 on its rear side adapted to be engaged by a spur pinion 36 rotated by a suitable handle 37 for raising and lowering the spindle as is usual in drill presses and other like machines. The weight of the spindle structure is counterbalanced by a weight 38 secured to the end of a cable 39 led over pulleys 40, 41 and 42 to the front of the machine where it is connected to a bracket 43 rigidly secured to the sleeve 31.

Loosely mounted upon ball bearings 44 and 45 is a driving pulley 46 rotated by a belt 47 driven by any suitable means such as an electric motor.

A suitable idler 52 is utilized for taking up the slack in the belt. The pulley 46 revolves freely about the clutch quill 25 and carries with it a driving clutch member 53 secured to the pulley by suitable screws 54 shown in Fig. 4. This clutch member has diametrically opposed jaws 55 each having an inclined face 56, as shown in Figs. 4 and 5. Secured to the upper side face of the pulley 46 and about the clutch member 53 is a hardened steel or other annulus 57 secured by a plurality of screws 57', three in number in the side face of the hub of the pulley. Engaging this hardened annulus 57 is a similar hardened annulus 58 having secured therein a plurality of pins 59, three or more in number, which pass loosely into suitable openings in a thrust ring 60. The annulus 58 and the thrust ring 60 are coupled together by suitable bolts 60' passing loosely through the thrust ring 60 and threaded into the annulus 58. Between the two members, to wit, the annulus and the thrust ring and surrounding the bolts are suitable springs 60'' which tend to separate the two and provide a yielding connection therebetween. The heads of the bolts limit the separation of the two members. This ring 60 is provided with a shoulder 61 adapted to be engaged by a driven clutch member 62 provided with opposed clutch jaws 63 similar to the jaws 55 and each provided with an inclined shoulder 64. The inclined shoulders of the two sets of jaws are so constructed and arranged that the two inclines are adapted for engagement of a semi-positive nature with each other, when in driving relation, as is clearly shown in Fig. 5. This clutch member 62 is loosely splined by means of keys 65 to the clutch quill 25 so that it rotates with the quill and yet is free to slide upon it. This clutch member is also provided with an annular bead 66 V-shaped in cross section and adapted to be engaged by V-shaped ends 67 of levers 68, four in number, mounted upon pins 69 in ears 70. These levers extend beyond the pins and are provided with cup shaped ends 71, adapted to receive the thrust springs 72, each mounted upon the end of a push rod 73 extending through a radial opening 74 in a thimble 75 threaded at 76 to the upper end of the clutch quill 25. Slidably mounted in the thimble 75 is a spring adjusting plunger 77 provided with a tapered portion 78 adapted to be raised and lowered into engagement with the pins 73 to increase or decrease the tension upon the springs 72. This adjustment is accomplished by means of a threaded shank 79 forming a part of the plunger 77 and passing loosely through a collar 80 threaded into the upper end of the thimble. A pin 81 extends radially through the collar and into a suitable guide way 82 in the threaded shank 79 and prevents rotation of this shank with respect to the collar. A nut 83 serves as a means for adjusting the plunger up and down and hence varying the tension upon the springs 72.

The mechanism for moving the clutch member 62 includes a shifting rod 84 provided with a cross pin 85 at its upper end passing through diametrically disposed slots 86 in the side wall of the clutch quill 25 and entering suitable openings in the clutch member 62 whereby when the rod 84 is lowered from the position shown in Fig. 1, the bead 66 will be moved past the toes 67 of the levers 68 moving them outwardly until the toes pass above the bead thereby bringing inclined faces 56 and 64 into engagement, as shown in Fig. 5, when the clutch quill 25 will be driven and through the gears 24 and 23 will drive the spindle quill 22 and hence the spindle. This rod 84 is controlled in its movement by a handle 86 pivoted at 87 and having a yoked end provided with pins 88 entering recesses 89 in a ball bearing thrust collar structure, generally indicated at 90, and secured upon the lower end of the clutch rod 84.

The levers 68 and the mechanism associated therewith are covered by a suitable canopy 91 removably secured in any suitable manner to the web of the pulley 46.

As before suggested, the device is used in some instances for securing the heads of motor cylinder blocks in place and when it is used for this or any similar work the operation is substantially as follows: The block is placed upon the base and if the studs are to be secured to the block a suitable chuck or other holding device is secured in place in the spindle, the stud being held in the chuck. If a nut or bolt is to be supplied to the article, the operation is substantially the same, except that a different type of tool is used. In any event, when the stud or nut is supplied to the tool in the spindle the operator moves the spindle to a position over the receiving part of the work and pulls down upon the handle 86 which moves the rod 84 downward causing the driven clutch member 62 to be moved downward against the holding tendency of the toes 67 of the levers 68 until the bead 66 passes below the toes 67 into the position shown in Fig. 5, when the springs 60″ will be compressed against the annulus 58 causing it to be forced down against the annulus 57 and producing a friction type of engagement between these two members which results in the pulley driving, by initial frictional engagement, the ring 60 which in turn by this frictional engagement with the driven clutch member 62 causes it to be rotated in the same direction. Continued rotation of this driven clutch member 62, produces engagement of the inclined surfaces 56 and 64 of the clutch jaws resulting in a semi or substantially positive drive being transmitted from the pulley 46 to the spindle and hence to the work. When the stud or nut is "socked" or driven home the resistance to rotation plus the tension of the springs 60″ together becomes sufficient to cause the inclined surfaces 56 and 64 to cam the driven clutch member 62 upward from the position shown in Fig. 5 to that shown in Fig. 1 when the clutch member will be instantaneously released and the drive will be cut off from the spindle. It is obvious that the tension on the levers 68 may be varied by the adjustment of the tapered plug 77 which, when it is moved upward, thrusts outward upon the pins 73 and increases the tension upon the springs 72.

When the clutch is released, the spindle is free and the wrench or other device may be readily removed from the work.

The adjustment of the plunger 77 with its tapered portion 78 is effected through the instrumentality of the threaded stem 82 and the nut 83 and in order to prevent the nut from backing off, its lower face is provided with a series of projections 93 adapted to engage recesses 94 in the collar 80. By this arrangement it will be seen that when the nut is rotated in one direction or the other the projections move up out of the recesses causing the tapered portion 78 to engage the spring pressed pins 73, but when the projections and recesses are again in registry they will nest and hold the parts in adjusted position.

When the device is used for removing or backing off nuts or studs, the motor by which the belt 47 is driven is of the reversible type and it is reversed by any suitable well known reversing switch mechanism. This produces a reverse rotation of the parts and practically all of the parts operate in the same manner in which they operate when setting up nuts or studs, except that in place of the inclined jaws 64 and 56 engaging with each other, the square shoulders 55' and 63' of these members engage each other and produce a positive clutch drive between the parts of the clutch and result in great force or impact being brought to bear upon the nut, loosening the same and producing its removal.

Having described my invention, I claim:

1. In a machine of the class described, a work spindle, and driving means therefor, including a friction clutch and a semi-positive clutch, said semi-positive clutch being adapted for self-release upon predetermined load on said spindle, and said friction clutch being associated with said semi-positive clutch to be released upon release thereof.

2. In a machine of the class described, a work spindle, and driving means therefor, including a friction clutch and a semi-positive clutch, said semi-positive clutch comprising members having jaws with inclined engaging faces adapted to slide upon each other to produce relative longitudinal releasing movement of said members, means for yieldably maintaining said members in engaged relation, said friction clutch being associated with said semi-positive clutch to be released by said releasing movement.

3. In a machine of the class described, a work spindle, and driving means therefor, including a friction clutch and a semi-positive clutch, said semi-positive clutch being adapted for self-release upon predetermined load on said spindle, said friction clutch being associated with said semi-positive clutch to be released upon release thereof, and means for maintaining said clutches released.

4. In a machine of the class described, a work spindle, and driving means therefor, including a friction clutch and a semi-positive clutch, said semi-positive clutch comprising members having jaws with inclined engaging faces adapted to slide upon each other to produce relative longitudinal releasing movement of said members, means for yieldably maintaining said members in engaged relation, said friction clutch being associated with said semi-positive clutch to be released by said releasing movement, control means for effecting engagement of said clutch members, means for yieldably maintaining said members in engaged or released relation, said friction clutch being associated with said semi-positive clutch to be released by said releasing movement.

5. In a machine of the class described, a work spindle, and driving means therefor, including a pair of clutch members each having a friction clutch portion and an inclined jaw portion, the friction clutch portion of one of said clutch members being yieldably mounted for engagement with its corresponding portion of the other member before engagement of said jaw clutch portions, and controlling means for said clutch members comprising a ring having a bead tapered on both sides, tension means engaging said bead for holding the clutch coupled or uncoupled, said tension means comprising levers having portions engaging the tapered sides of said bead, and means for exerting a tension on said levers.

6. In driving and clutch mechanism for work spindles, driving and driven portions, clutch members between said portions, operator-operated means for moving one of said members into engagement with the other, means responsive to the torque in the drive to disengage said members, and means for yieldably maintaining said members in engagement or disengagement and comprising an annular portion on the movable member providing two inclined cam faces, and yielding means engaging said annular portion and comprising levers having ends for engagement with said cam faces, and tension means for said levers.

In testimony whereof I hereby affix my signature.

WILLIAM D. BUSS.